(12) United States Patent
Grafmueller et al.

(10) Patent No.: US 8,013,778 B2
(45) Date of Patent: Sep. 6, 2011

(54) HIGH-RESOLUTION SYNTHETIC APERTURE RADAR DEVICE AND ANTENNA FOR ONE SUCH RADAR

(75) Inventors: Bernhard Grafmueller, Markorf (DE); Christoph Schaefer, Friedrichshafen (DE)

(73) Assignee: Astrium GmbH, Munich (DE)

( * ) Notice: Subject to any disclaimer, the term of this patent is extended or adjusted under 35 U.S.C. 154(b) by 137 days.

(21) Appl. No.: 12/158,538

(22) PCT Filed: Dec. 20, 2006

(86) PCT No.: PCT/DE2006/002279
§ 371 (c)(1),
(2), (4) Date: Sep. 30, 2008

(87) PCT Pub. No.: WO2007/076824
PCT Pub. Date: Jul. 12, 2007

(65) Prior Publication Data
US 2009/0079621 A1 Mar. 26, 2009

(30) Foreign Application Priority Data
Dec. 22, 2005 (DE) .................. 10 2005 062 031

(51) Int. Cl.
*H04K 3/00* (2006.01)
(52) U.S. Cl. .................. 342/25 R; 342/59
(58) Field of Classification Search .......... 342/25 R
See application file for complete search history.

(56) References Cited

U.S. PATENT DOCUMENTS

| | | | | |
|---|---|---|---|---|
| 2,991,467 | A | * | 7/1961 | Clarke .................. 342/102 |
| 3,546,700 | A | * | 12/1970 | Rihaczek .................. 342/371 |
| 4,134,113 | A | * | 1/1979 | Powell .................. 342/25 C |
| 5,495,248 | A | * | 2/1996 | Kawase et al. .......... 342/25 A |
| 5,745,069 | A | * | 4/1998 | Gail .................. 342/25 F |
| 6,135,955 | A | * | 10/2000 | Madden et al. ............ 600/436 |
| 6,282,963 | B1 | * | 9/2001 | Haider .................. 73/602 |
| 6,400,306 | B1 | | 6/2002 | Nohara et al. |
| 2002/0033765 | A1 | | 3/2002 | Bickert et al. |
| 2003/0020648 | A1 | * | 1/2003 | Fienup .................. 342/25 |
| 2004/0150547 | A1 | * | 8/2004 | Suess et al. .......... 342/25 A |

(Continued)

FOREIGN PATENT DOCUMENTS
DE  199 29 143  12/2000
(Continued)

OTHER PUBLICATIONS

Legg J A et al: "A SAR moving target ambiguity function", Fourth International Symposium on Signal Processing and Its Applications. ISSPA 96. Proceedings Main Symposium Queensland Univ. Technol Brisbane, Qld., Australia, 1996, pp. 841-844 vol. 2, XP010241117, ISBN: 1-86435-210-8.

(Continued)

*Primary Examiner* — Timothy A Brainard
(74) *Attorney, Agent, or Firm* — Greenblum & Bernstein, P.L.C.

(57) ABSTRACT

The invention relates to a high-resolution synthetic aperture radar device (10) comprising at least one transmitting antenna (TX1-TX3) for producing and emitting radar pulses for scanning an object (12), a receiving antenna (14) for receiving the radar beams (20, 22, 24) emitted and reflected by an object, wherein the receiving antenna (14) has several sub-apertures (RX1-RX17) arranged along elevation, which form a minimum of azimuth apertures, wherein the high-resolution synthetic aperture radar device is embodied such that pulse signals (18) are emitted at irregular time intervals.

23 Claims, 5 Drawing Sheets

U.S. PATENT DOCUMENTS

2005/0020312 A1* 1/2005 Gruet et al. ............... 455/562.1
2005/0195103 A1* 9/2005 Davis et al. .................. 342/99

FOREIGN PATENT DOCUMENTS

| | | |
|---|---|---|
| DE | 1992943 | 12/2000 |
| EP | 0389111 | 9/1990 |
| EP | 1134592 | 9/2001 |
| EP | 1241487 | 9/2002 |
| EP | 1471600 | 10/2004 |

OTHER PUBLICATIONS

Mobley S G et al: "Synthetic aperture radar with a non-uniform pulse repetition interval", System Theory, 1995., Proceedings of the Twenty-Seventh Southeastern Symposium on Starkville, MS, USA Mar. 12-14, 1995, Los Alamitos, CA, USA, IEEE Copmut. Soc, Mar. 12, 1995, pp. 498-502, XP 010134436, ISBN: 0-8186-6985-3, Chapter "Introduction", Abstract.

Krieger G et al: "Unambiguous SAR signal reconstruction from nonuniform displaced phase center sampling", IEEE Geoscience and Remote Sensing Letters, IEEE USA, vol. 1, No. 4, Oct. 2004, pp. 260-264, XP002429466, ISSN: 1545-598X.

Bertoni R et al: "Data compression device for SAR application", Geoscience and Remote Sensing Symposium, 1994. IGRASS '94. Surface and Atmospheric Remote Sensing Technologies, Data Analysis and Interpretation., International Pasadena, CA, USA Aug. 8-12, 1994 New York, NY USA, IEEE, US, vol. 4, Aug. 8 1994, pp. 2194-2196, XP01038739, ISBN: 0-7803-1497-2.

Zhenfang Li et al: "Generation of wide-swath and high-resolution SAR images from multichannel small spaceborne SAR systems", IEEE Geoscience and Remote Sensing Letters, IEEE USA, vol. 2, No. 1, Jan. 2005, pp. 82-86, XP002429467, ISSN: 1545-598X.

Bliss D W et al Institute of Electrical and Electronics Engineers: "Multiple-input multiple-output ( MIMO ) radar and imaging: degrees of freedom and resolution", Conference Record of the 37th. Asilomar Conference on Signals, Systems, & Computers. Pacific Groove, CA, Nov. 9-12, 2003, Asilomar Conference on Signals, Systems and Computers, New York, NY: IEEE, US, vol. 1 of 2. Conf. 37, Nov. 9, 2003, pp. 54-59, XP010701593, ISBN: 0-7803-8104-1.

Jordan R L et al: "The SIR-C/X-SAR Synthetic Aperture Radar System", Proceedings of the IEEE, IEEE. New York, US, vol. 79, No. 6, Jun. 1, 1991, pp. 827-838, XP000262356, ISSN: 0018-9219.

Lombardo P: "A multichannel spaceborne radar for the COSMO-skymed satellite constellation", Aerospace Conference, 2004. Proceedings., 2004 IEEE Big Sky MT USA Mar. 6-13, 2004, Piscataway, NJ, USA, IEEE, US, Mar. 6 2004, pp. 111-119, XP010747971, ISBN: 0-7803-8155-6.

Klemm, "Space-Time Adaptive Processing," IEE Radar, Sonar, Navigation and Avionics Series 9, ISBN 0 85296 946 5 (1998).

* cited by examiner

HIGH-RESOLUTION SYNTHETIC APERTURE RADAR DEVICE AND ANTENNA FOR ONE SUCH RADAR

CROSS-REFERENCE TO RELATED APPLICATIONS

The instant application is a U.S. National Stage of International Application No. PCT/DE2006/002279 filed Dec. 20, 2006, and claims priority of German Patent Application No. 10 2005 062 031.0 filed Dec. 22, 2005. The disclosure of International Application No. PCT/DE2006/002279 is expressly incorporated by reference herein in its entirety.

BACKGROUND OF THE INVENTION

1. Field of the Invention

The invention relates to a high-resolution synthetic aperture radar device and an antenna for a high-resolution synthetic aperture radar device.

2. Discussion of Background Information

In synthetic aperture radar (SAR), an object, such as, for example, the earth's surface, is scanned by a short moving antenna, via which pulse signals, i.e., pulses are emitted at a defined time interval and the echo signals, i.e., the pulse signals reflected by scanned objects, are received. The direction of movement of the short antenna is also referred to as azimuth or along track. An image of the scanned object is calculated for each area illuminated and scanned by the antenna by an SAR processor through corresponding data processing of the echo signals. For example, SAR systems are used for measuring and imaging the earth's surface by satellites.

In SAR the important parameters are the azimuth resolution, the swath width of the scan and the geometric resolution in the range. The decisive factor for the geometric resolution is the bandwidth of the emitted pulse signals. The pulse repetition frequency (PRF) determines the scanning rate. With conventional SAR systems, the smallest azimuth resolution (along track) and the largest swath width (across track) that can be achieved at the same time are coupled to one another in that a high PRF is necessary for a high azimuth resolution, but a low PRF is necessary for a large swath width. In other words, with conventional SAR a high azimuth resolution determines a small swath width.

This conflict can be resolved by a so-called high-resolution wide-swath (HRWS) SAR, such as is known, for example, from EP 1 241 487 A1. The HRWS SAR is operated with additional receive (RX) antennas or receive apertures, i.e., several, in particular three, azimuth apertures, which makes it possible to reduce the PRF without reducing the azimuth resolution. Furthermore, the instrument is operated bistatically, i.e., with separate transmitting (TX) and receiving (RX) antennas. The elevation, i.e., the measurement in the transverse direction to the azimuth direction of the TX antenna is reduced in order to illuminate a large swath width, and the elevation of the RX antenna is correspondingly increased in order to maintain the sensitivity of the instrument. Finally, each azimuth aperture is divided into several sub-apertures in order to be able to scan a broad swath by digital beam forming (DBF). However, one disadvantage of the HRWS SAR lies in the large antennas, which in particular with satellite-based SAR lead to heavy and thus expensive payloads.

SUMMARY OF EMBODIMENTS OF THE INVENTION

According to embodiments of the present invention, a high-resolution synthetic aperture radar device and an antenna for a high-resolution synthetic aperture device is provided, which make it possible to scan the broadest possible swaths with high azimuth resolution with a much smaller antenna area than with an HRWS SAR.

In embodiments, a high-resolution synthetic aperture radar device includes at least one transmitting antenna for producing radar beams for scanning an object, and a receiving antenna for receiving radar beams reflected by the object. The receiving antenna has several sub-apertures arranged in elevation, and the high-resolution synthetic aperture radar device is embodied such that pulse signals are emitted at irregular time intervals. In further embodiments, an antenna for a high-resolution synthetic aperture device includes two or more transmitting antennas, which are embodied for emitting respectively one radar beam in the microwave range, and a receiving antenna embodied for receiving reflected radar beams in the microwave range, which in elevation has several sub-apertures that form fewer than three azimuth aperture. Preferred embodiments of the invention are shown by the dependent claims.

One concept of embodiments of the invention lies is retaining a high pulse repetition frequency or PRF as with conventional SAR, but scanning an object in a parallel manner with several radar pulses emitted sequentially. In order to reduce the required antenna area compared to HRWS SAR, fewer than three azimuth apertures are provided, for example, two or preferably only one azimuth aperture. Since pulse signals are emitted regularly via the radar beams, the scanning operations of received radar beams must be interrupted, which results in data gaps in the scanning of an object, which lead to black stripes in the subsequent SAR image. In order to avoid data gaps of this kind, according to embodiments of the invention the pulse signals of the radar beams are emitted at irregular time intervals, so that data gaps do not always occur at the same points during scanning, which would lead to a complete loss of azimuth signals, but are dispersed from echo to echo and lead to only local dropouts in the scans. Local dropouts of this type can then be subsequently reconstructed by a resampling method through reconstruction of the missing scanning values.

Embodiments of the invention have the advantage that broad swaths with a high azimuth resolution can be imaged with a smaller antenna surface than with the HRWS SAR. A high-resolution synthetic aperture radar device according to embodiments of the invention can thus be built to be smaller and lighter overall than an HRWS SAR, through which the costs of an SAR device according to embodiments of the invention are reduced, in particular the transport costs, for example, into space.

The embodiments of invention now relate according to one embodiment to a high-resolution synthetic aperture radar device comprising at least one transmitting antenna for producing radar beams for scanning an object, a receiving antenna for receiving radar beams reflected by the object, wherein the receiving antenna has several sub-apertures arranged along an elevation, and wherein the high-resolution synthetic aperture radar device is embodied such that pulse signals are emitted at irregular time intervals.

An SAR device here means any SAR platform, in particular an SAR satellite.

Furthermore, the high-resolution synthetic aperture SAR radar device can be embodied such that the sub-apertures form fewer azimuth apertures than in the case of an HRWS SAR.

In order to fill data gaps in the scanning of an object, the high-resolution synthetic aperture radar device can furthermore be embodied such that a resampling method is used for a processing of received radar echoes in the azimuth. The already mentioned local dropouts in the scans of the received radar beams and echo pulse signals contained therein can be subsequently reconstructed through the resampling method.

The high-resolution synthetic aperture radar device can furthermore be embodied such that a transmitting antenna is operated in the frequency multiplex.

In order to achieve a high signal-to-noise ratio, transmission should be carried out at the highest possible power. In order to reduce the peak power values necessary for a PRF, the high-resolution synthetic aperture radar device can furthermore be embodied such that at least two transmitting antennas are operated simultaneously in the frequency multiplex. Through this, the multiple of the transmission energy can be used compared to transmitting without a frequency multiplex within a stipulated pulse signal duration or pulse duration.

Since several radar pulses are emitted via the transmitting antennas at short time intervals, several reflected radar echoes are also received at the same time by the receiving antenna. In order to avoid superpositions of the received radar echoes from different transmission pulses and thus errors (so-called range ambiguities) in the subsequent SAR image, the high-resolution synthetic aperture radar device can furthermore be embodied to provide one receiving channel respectively for each of the radar echoes by digital beam forming.

In particular, it can be embodied to strictly separate a received radar echo from adjacent received radar echoes, in that the signals of the sub-apertures in the digital domain are provided with time-dependent complex weighting factors. In particular with a high PRF and thus a small pulse repetition interval and echo centers lying close to one another on the scanned object, a weighting of this type of the individual signals of the sub-apertures of the receiving antenna proves to be an efficient method of separating adjacent radar echoes.

In particular, it can be embodied such that the time-dependent complex weighting factors are embodied such that an antenna diagram in the directions obtains a zero.

In a further development, the high-resolution synthetic aperture radar device can furthermore be embodied so as to carry out a space-time adaptive processing of the signals of the sub-apertures. A weighting in the space-time range of the signals of the sub-apertures thereby occurs, through which an even more precise separation of adjacent radar echoes can be achieved.

In order to reduce the data traffic to a central SAR processor as much as possible, the high-resolution synthetic aperture radar device can furthermore be embodied to compress the data obtained from the received radar echoes before transmission to a ground station. The compression can occur, for example, by removing data that are superfluous, because they are redundant from a scan of the received reflected radar beams.

In a preferred embodiment, the high-resolution synthetic aperture radar device has for each transmitting antenna respectively one transmission module and front end for generating a radar pulse. Radar pulses can thus be emitted independently of one another, which makes it possible to achieve a high flexibility in the use of the device.

In particular, the transmission modules and front ends can be embodied so as to emit transmitting chirps coherently and simultaneously, wherein each transmission module and front end is embodied to respectively emit in a different frequency range. A high transmission energy can thus be achieved with a high PRF, which is necessary for a high signal-to-noise ratio.

In order to be able to separate again the radar pulses emitted in different frequency ranges, the high-resolution synthetic aperture radar device can have digital frequency filters that are provided in order to separate in terms of frequency the data streams produced from radar beams received.

Another embodiment of the invention relates to a high-resolution synthetic aperture radar device comprising at least two transmitting antennas for generating radar beams for scanning an object, wherein the at least two transmitting antennas are operated simultaneously in the frequency multiplex.

Another embodiment of the invention relates to an antenna for a high-resolution synthetic aperture radar device in particular according to one of the preceding claims, comprising two or more transmitting antennas, which are arranged in elevation next to one another and are embodied for emitting respectively one radar beam in the microwave range, a receiving antenna embodied for receiving reflected radar beams in the microwave range, which in elevation is arranged next to the transmitting antennas and in elevation has several sub-apertures that form fewer than three azimuth apertures.

The antenna can furthermore be embodied such that the two or more transmitting antennas in elevation are arranged next to one another.

The antenna can furthermore be embodied such that the receiving antenna in elevation is arranged next to the two or more transmitting antennas.

In a preferred embodiment of the antenna the sub-apertures form exactly one azimuth aperture. A very compact antenna is thus created, which nevertheless renders possible a high resolution in the azimuth.

In order to cover the region illuminated by the transmitting antennas and to adequately suppress quantization lobes for all necessary scan angles, according to a preferred embodiment of the antenna the height of each sub-aperture in elevation is lower than the height of each transmitting antenna in elevation.

Further advantages and possible applications of the embodiments of the present invention are shown by the following specification in connection with the exemplary embodiments depicted in the drawings.

The terms and assigned reference numbers used in the list of reference numbers attached at the end are used in the specification, in the claims, in the abstract and in the drawings.

DETAILED DESCRIPTION OF EMBODIMENTS OF THE INVENTION

Identical and/or functionally identical elements can be provided below with the same reference numbers. The absolute values and measurement data given below are only exemplary values and do not represent a restriction of the invention to dimensions of this type.

Figure 1:
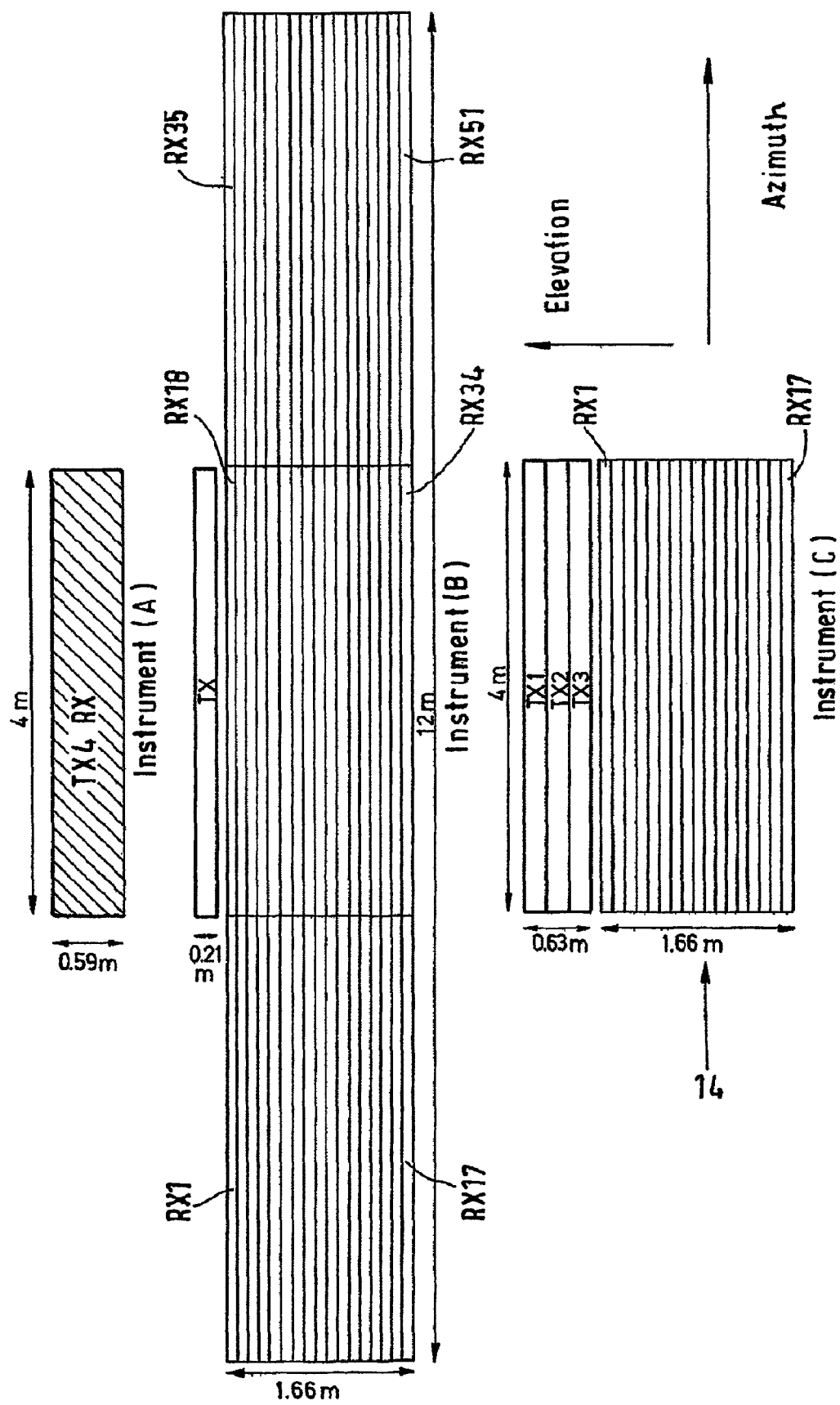
FIG. 1 Three different exemplary embodiments of antennas of SAR devices, wherein one antenna belongs to a conventional monostatic SAR, one antenna belongs to a bistatic HRWS SAR and one antenna belongs to an SAR device according to the invention.

An exemplary antenna of a conventional monstatic SAR instrument is shown in FIG. 1 labeled as instrument (A). The term "instrument" here means in particular an SAR device such as, for example, implemented on an SAR satellite. The instrument (A) of FIG. 1 is typically operated in the X band with a bandwidth of the emitted pulse signals of approx. 150-200 MHz and an average transmitting power of 750 W. The joint transmitting (TX) and receiving (RX) antenna has dimensions of approx. 4 m in the azimuth direction (azimuth) and a height (elevation) of approx. 0.59 m. The satellite with the instrument (A) is located at an orbit height of approx. 500 km. The PRF is approx. 4200 to 5300 Hz, which corresponds to a geometric resolution of approx. 2 m. The duty cycle of the emitted pulse sequence is approx. 20 to 30%.

It fundamentally applies for SAR systems that the size of the transmitting antenna determines the range illuminated with a radar pulse. The dimension in elevation (aperture height) of the transmitting antenna is hereby inversely proportionally to the final image strip width. The aperture height of the transmitting antenna must therefore be reduced to produce a larger image strip width. This is the case with the antenna of an HRWS SAR explained below.

An exemplary antenna of an HRWS SAR is shown in FIG. 1 labeled as Instrument (B). The antenna is based on the performance of the instrument (A) of FIG. 1 and in contrast to instrument (A) has a TX antenna and a separate RX antenna, that is formed as a whole by a plurality, in this case exactly 51, "small" RX antennas, labeled RX1 through RX51. In order to reduce the nominal PRF of instrument (A) by a factor of 3, instrument (B) has three azimuth apertures according to three azimuth panels, each of which is formed by 17 sub-apertures according to 17 "small" RX antennas.

The TX antenna has an aperture height of only 0.21 m in order to achieve a swath width of greater than 80 km at all angles of incidence. The total aperture height of the RX antenna is 1.66 m in order to achieve a sufficient RX antenna gain in view of the small aperture height of the TX antenna. Each of the "small" RX antennas RX1 through RX51 has respectively a height of 0.098 m (sub-aperture height), which is smaller than the aperture height of the TX antenna, in order to cover the area illuminated by the TX antenna and to adequately suppress the quantization lobes for all necessary scan angles (<−13 dB). Instrument (B) is also operated with an average transmitting power of approx. 750 W. The duty cycle of the emitted pulse sequence is approx. an estimated 30%. The total antenna length is 12 m, that of each azimuth panel is 4 m, through which an azimuth resolution of 2 m can be achieved.

The signal received by each individual RX antenna RX1 through RX51 is fed to its own channel. Each channel has its own separate input of a downstream digital signal processor (not shown).

Finally, an antenna according to the invention labeled as instrument (C) is also shown in FIG. 1, such as can be used with an SAR device according to the invention, which emits pulses at irregular time intervals. In contrast to instruments (A) and (B), this antenna has three separate TX antennas, labeled TX1 through TX3, which respectively have the same dimensions as the TX antenna of instrument (B) and are arranged next to one another in the transverse direction to the azimuth direction. The three TX antennas TX1 through TX3 generate respectively radar pulses for scanning in elevation. As a receiving antenna, in contrast to instrument (B), only one azimuth panel with 17 "small" RX antennas is provided, which respectively have the same dimensions as the small RX antennas of instrument (B). The geometric resolution of instrument (C) corresponds to those of instruments (A) and (B).

The use of more than one azimuth aperture as with instrument (B) of FIG. 1 serves to reduce the nominally required PRF. The reduced PRF can be used to transmit longer pulses, through which the maximum transmitting power (peak power of the transmitter amplifier) can be reduced and/or the SNR can be improved compared to an instrument (A). However, with the present invention the primary objective is an enlargement of the swath width with unchanged SNR performance of the instrument compared to (A) using only one azimuth aperture.

Figure 2:
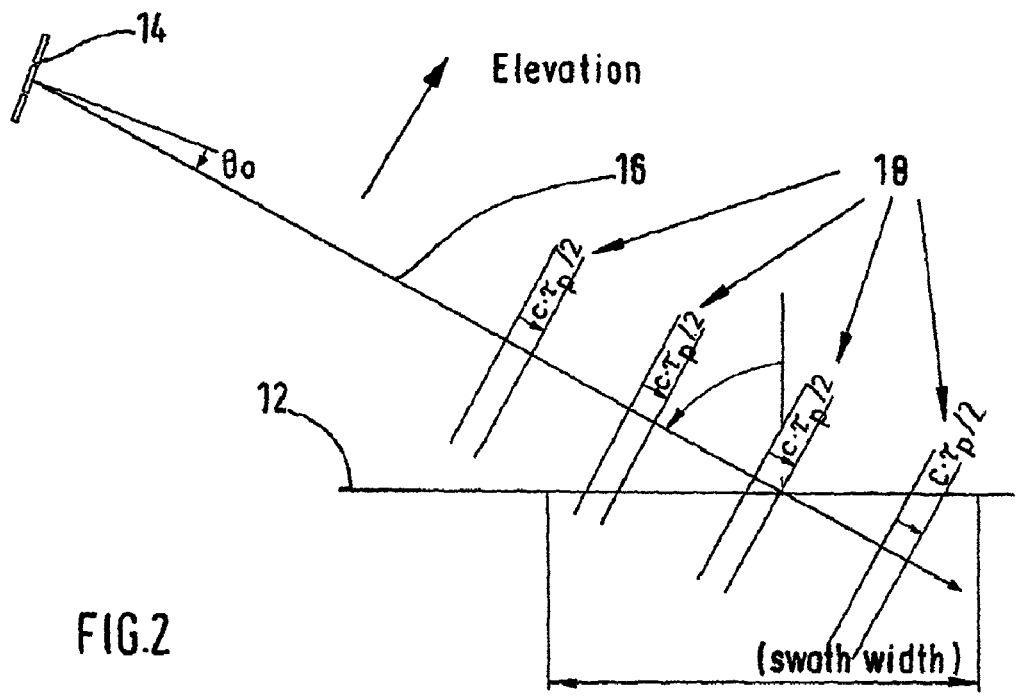
FIG. 2 The scanning of a broad swath of the earth's surface with an SAR, wherein echoes from several radar pulses are received by the SAR simultaneously.

FIG. 2 shows firstly in principle how the earth's surface 12 is scanned with an SAR device 10. The SAR device 10 transmits via an antenna 14 pulse signals or pulses in the form of a radar beam 16, to be more exact in the form of an antenna radiation lobe (antenna lobe) in the direction of the earth's surface 12. The radiation lobe has an aperture angle $\hbar_0$, which together with the angle of incidence $\eta$ of the radar beam 16 on the earth's surface 12 determines the swath width. Each emitted pulse signal 18 has a pulse duration $\tau_p$, which determines the range resolution $\Delta r$ of the SAR and the partial swath width in the slant range as follows:

$$\Delta r = \frac{1}{2} \cdot \tau_p \cdot c$$

(c is the speed of light). With the angle of incidence $\eta$, this can be converted to a partial swath width on the earth's surface 12 as follows:

$$\frac{\tau_p \cdot c}{2 \cdot \sin(\eta)}$$

Figure 3:
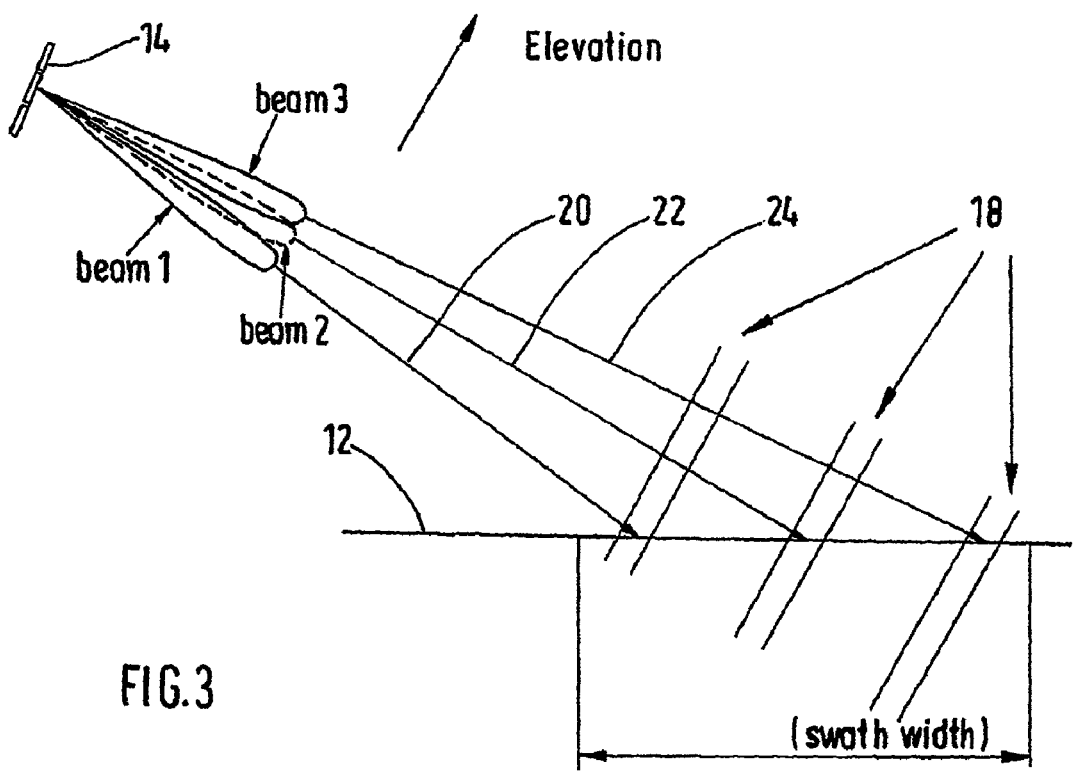
FIG. 3 The scanning of a broad swath of the earth's surface with an SAR, wherein three radar echoes are received by the SAR simultaneously by three antenna lobes.

The availability of several apertures in elevation and a digital beam forming upon reception given with an SAR device according to the invention permit the formation of several antenna lobes, each of which is directed at one of the partial swaths. When the respective main lobes have been sufficiently well localized and side lobes or quantization lobes have been sufficiently well suppressed, each antenna lobe "sees" only "its" echo signal, as is shown in FIG. 3 based on three antenna lobes 20, 22 and 24 directed to different partial swaths. The echo signal of each antenna lobe is stored as a separate so-called range line.

Figure 4:
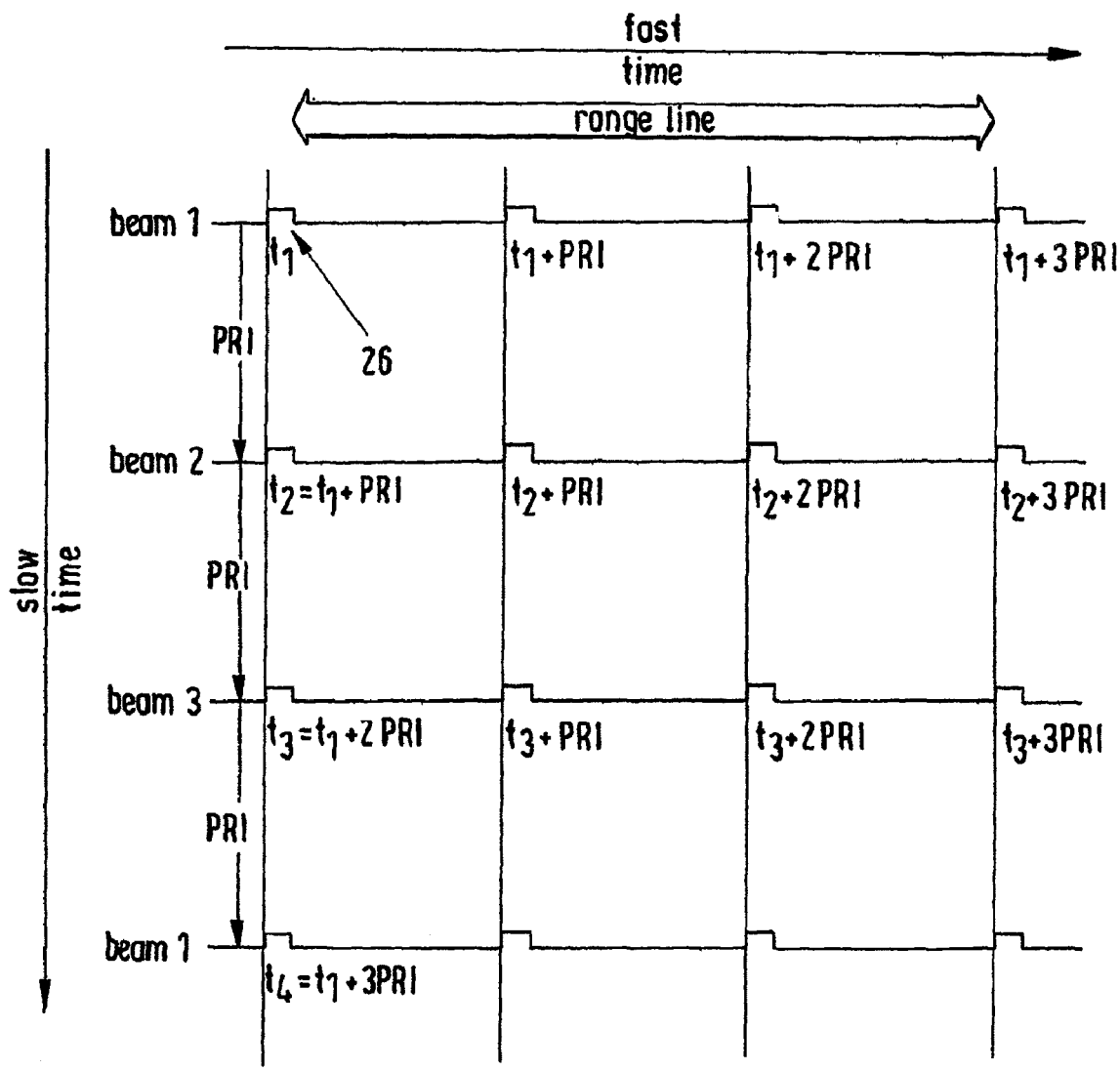
FIG. 4 Stored range lines of the three received and scanned radar echoes of the constellation shown in FIG. 3.

FIG. 4 shows the range line buffer of the instrument or of the SAR device according to the invention. The range lines received as echo signals by each of the three antenna lobes are shown as lines in FIG. 4. They are plotted under one another in the order they occur chronologically. In FIG. 4 therefore a "fast time" runs from left to right and a "slow time" from top to bottom. In FIG. 4 the range lines of three antenna lobes "beam 1," "beam 2" and "beam 3" are represented as shown in FIG. 3. The three antenna lobes follow at the time interval of a pulse period (PRI: pulse repetition interval) the respectively next pulse that enters the swath to be scanned and generate a range line for this swath. In the example shown, the scanned swath width is in the slant range $$R_2 - R_1 = (3 \cdot PRI - \tau_p) \cdot \frac{c}{2},$$

wherein $R_1$ and $R_2$ respectively refer to the smallest and largest slant range distance of the swath borders. The distance $R_1$ is hereby selected such that when a pulse enters the swath, the instrument can be switched over to receive:

$$R_1 = (n \cdot PRI + \tau_p) \cdot \frac{c}{2}.$$

The recording of a range line must be interrupted for a duration of $$\Delta T = PRI - \tau_p$$

after the start, since the transmission of a new pulse is then started. This is shown in FIG. 4 by gates (see reference number 26). Before the range line can be completed, a second gate occurs.

For the azimuth processing running in the "slow time" direction, the gates are lost scanning points. The gates widen further by half a pulse length on both sides, since each range line still has to be compressed before the azimuth processing, and lead to undesirable stripes in the subsequent SAR image. For a pulse length of, for example, 50 μs, they are at least approx. 15 km in the slant range.

According to the invention, the pulse period PRI is now varied to avoid the undesirable "black" stripes in the subsequent SAR image such that the pulse signals 18 of the radar beams 16 are emitted at irregular time intervals. In this manner the range line gates 26 do not all lie one under the other and no azimuth gaps exist without any scanning values. Although the azimuth gaps then represent a non-uniform scanning of the azimuth signal, a uniformly scanned azimuth signal can be reconstructed according to the generalized scanning theorem, however.

This will now be explained on the basis of an example. A sequence of pulse intervals is used in a so-called mode no. 6

PRI=10τ,9τ,8τ,7τ,6τ,10τ,9τ,...

wherein

τ=2τ$_p$, applies, i.e., τ corresponds to twice the pulse length $2\tau_p$. The mode no. 6 above is not the only or the best possibility for emitting pulses. A large number of other modes or possibilities exist, all of which have their specific advantages.

Figure 5:
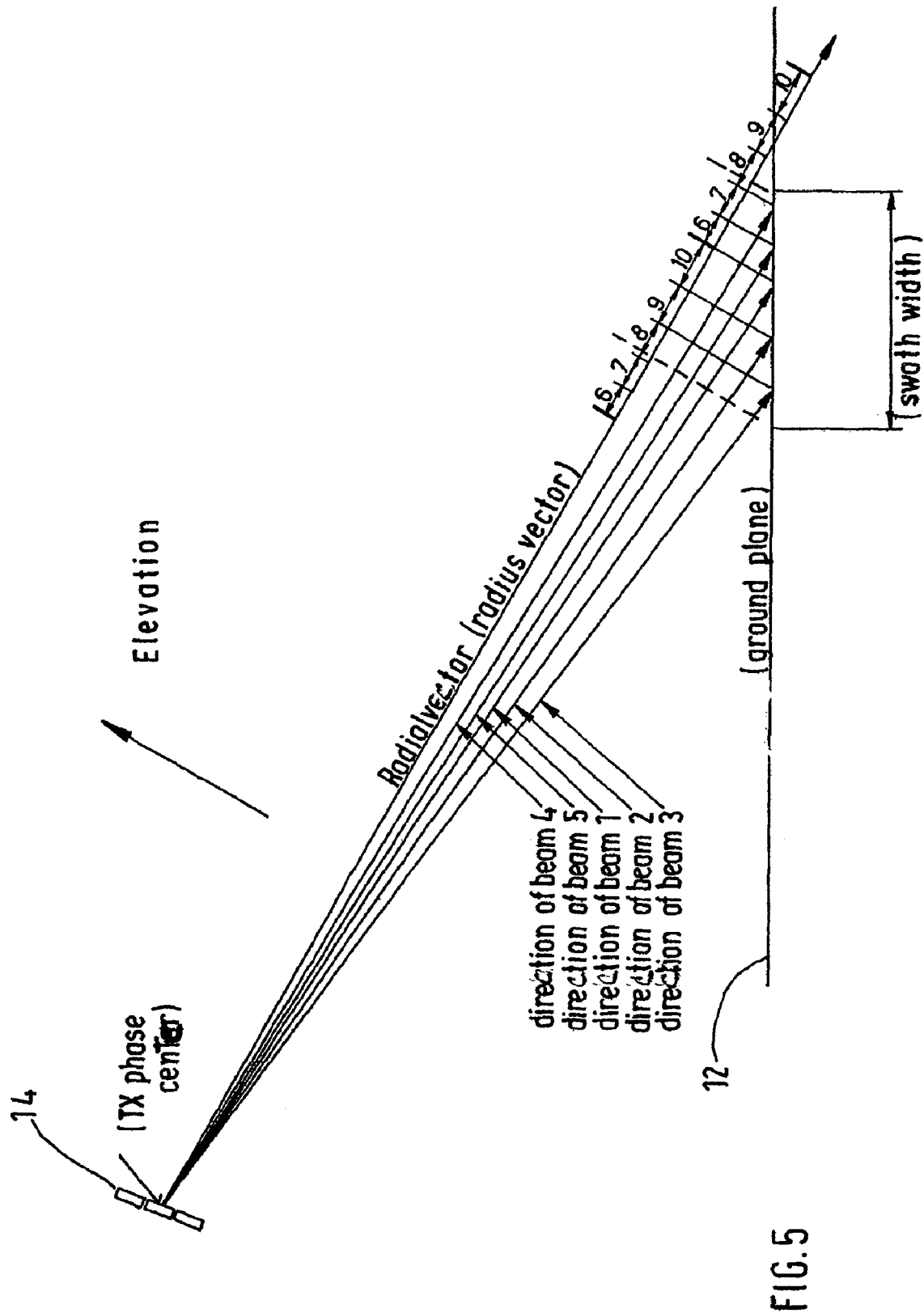
FIG. 5 An exemplary embodiment of an SAR device according to the invention with variable pulse repetition interval (PRI) and a total of five antenna lobes.

In FIG. 5 an SAR device 10, such as, e.g., an SAR satellite, now receives radio echoes simultaneously and coherently via a corresponding receiving antenna with five antenna lobes "beam 1" through "beam 5". In FIG. 5 the slant range axis is divided in accordance with mode no. 6, i.e., 6 stands there for a radial distance of $$6 \rightarrow 6\tau \cdot \frac{c}{2}.$$

At the beginning of a PRI there is always the transmission of a pulse. As soon as the pulse has entered the swath to be imaged or scanned, to be more exact, as soon as the echoes, belonging to the pulse, of the foremost scattering centers of the swath have been received, a SCORE (Scan On Receive) beam follows the pulse and records a range line. The recording is then interrupted when a new pulse is emitted. In the example shown in FIG. 5 there are—as already mentioned—five receiving antenna lobes and four interruptions of the recording per range line. When a lobe becomes free, it follows the next pulse entering the swath.

Figure 6:
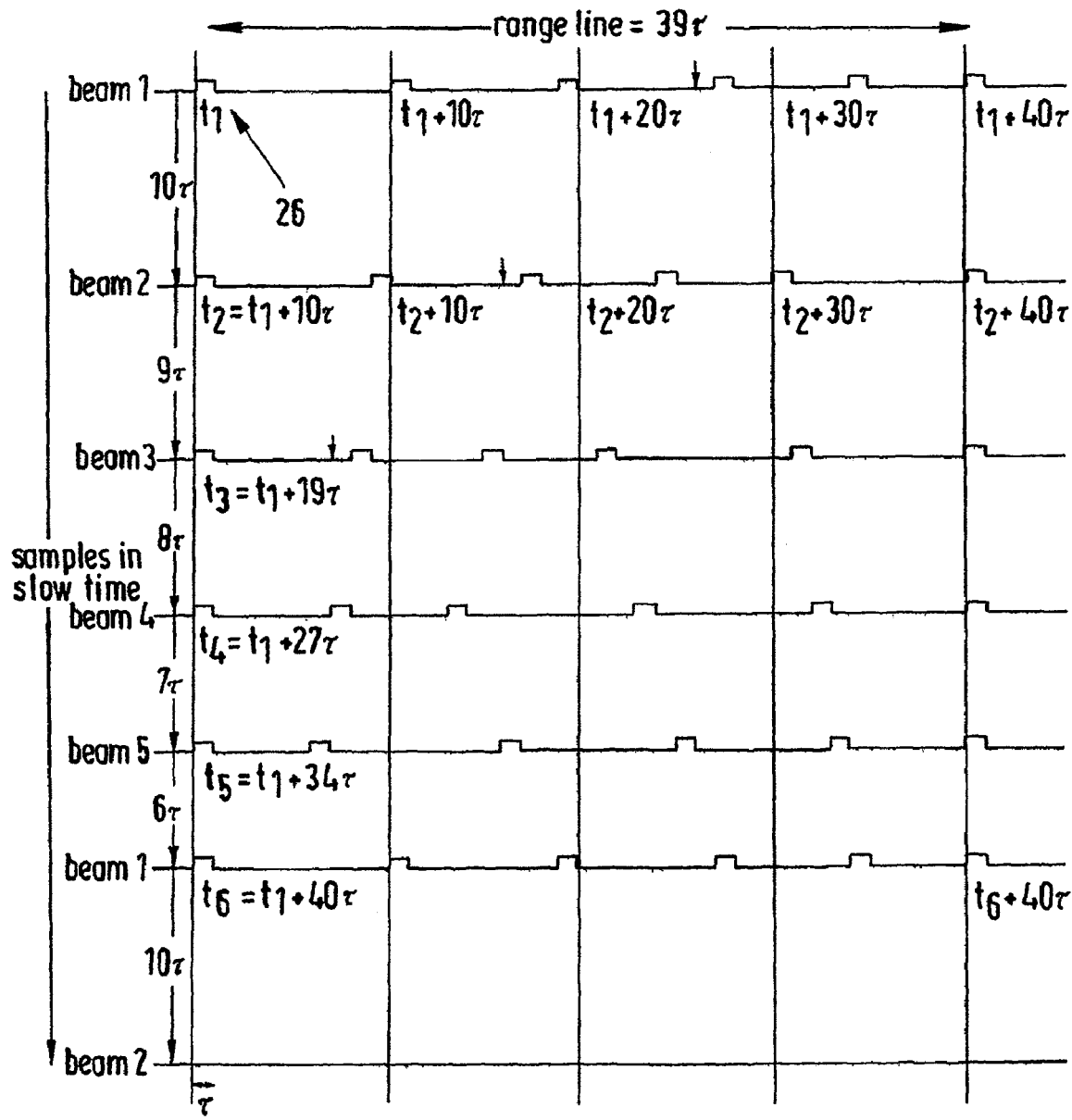
FIG. 6 Stored range lines of the five radar echoes received and scanned via separate antenna lobes of the constellation shown in FIG. 5.

The associated data, which are stored, are shown as a range line in FIG. 6. At the beginning and the end of each range line there are again intervals that have no data, since the gates 26 lie precisely one under the other in the gaps. A time interval extends in each range line between the "data-less" intervals, which time interval covers a "fast time" of 39τ and which contains four gates without data. Each of these intervals corresponds to a recorded range line or to a recorded swath width. For each azimuth gap of five potential samples, no more than one is missing in the azimuth processing. This means per 40τ signal duration in the azimuth at least four samples are always available for its reconstruction.

Now the azimuth processing will be explained in detail below. A bandwidth-limited signal can also be reconstructed with non-uniform scanning, as described in the article "Unambiguous SAR Signal Reconstruction from Nonuniform Displaced Phase Center Sampling," G. Krieger, N. Gebert, A. Moreira, IEEE Geoscience and Remote Sensing Letters, Vol. 1, no. 4, October 2004. This article describes an investigation of a scanning in which M separate apertures, uniformly moved and displaced with respect to one another in the azimuth recorded a signal of bandwidth B with uniform scanning rate $$f_s = \frac{B}{M}$$

reduced by the factor M. The intervals of the apertures are thereby theoretically not subject to virtually any restrictions; above all different apertures may not be located at exactly the same azimuth position at different scanning points in time. In the event of signals degraded by a high noise level, the SNR of the reconstructed signal drops to the extent that such a "prohibited" situation of multiple scanning at the same point is initiated.

Based on the above example, in the reconstruction of each individual azimuth signal (each individual column of the diagram in FIG. 6) respectively at least four antenna lobes provide a sample. The four lobes as sample providers can be compared to the individual apertures from the above article; they each supply a sample with uniform period of 40τ, and are thereby between 6τ and 10τ apart from one another. As long as they have a spacing different from 0, a noise-free azimuth signal can be perfectly reconstructed. However, in reality, it should be ensured that these spacings do not become too small in order to avoid a rising noise level with the reconstructed signal. As a dimension value for the non-uniformity, the largest time gap occurring here in the merged sampling (19τ in the example shown in FIG. 6) relative to the nominally necessary (with uniform scanning) $PRI_0$ derived from the azimuth bandwidth B $$u = \frac{19\tau}{PRI_0} = 19\tau \cdot B$$

can be used. Because M=4, the PRI of the equivalent uniform scanning achieved after resampling is given in the following example as $$PRI = \frac{40\tau}{M} = 10\tau.$$

The PRI after resampling must not exceed the required nominal $PRI_0$, i.e., $20\tau_p = 10\tau = PRI \leq PRI_0$.

This is a condition for the maximum permissible pulse duration $\tau_p$ in the present mode no. 6 of a non-uniform scanning. Using the largest possible pulse duration, the value 1.9 results for the non-uniformity u because of $PRI=PRI_0$ and $\tau=PRI_0/10$. For shorter pulse durations, because $\tau=PRI_0/10<PRI/10$ the value u is correspondingly smaller and already corresponds to an overscanning.

Based on the simulation results published in the above-mentioned article, it is assumed here that a satisfactory SNR can be achieved for u<2 with the reconstructed azimuth signal. For u=1 there would be non-uniform scanning with a maximum scanning period, which would be close to the largest possible PRI with uniform scanning.

Of course, mode no. 6 can vary. Different examples of non-uniform scanning will now be evaluated comparatively below. For this evaluation, the swath widths respectively achievable for the examples and the peak power values thereby required for transmission are estimated in each case.

A mode of a non-uniform scanning is characterized by the K-dimensional integer vector v $v=[v_1 v_2 \ldots v_k]$.

The 5-dimensional vector $v=[10\ 9\ 8\ 7\ 6]$ corresponds, for example, to the mode no. 6.

M<K designates the minimum number of azimuth samples that are available in the azimuth processing (in the example of mode no. 6, M=4). Where $$S = \sum_{k=1}^{K} v_k$$

(with mode no. 6, S=40) the maximum possible pulse duration results from the condition $S\tau = M \cdot PRI$, since $S\tau$ represents the scanning period of each of the M separately scanning beams and each of these beams may scan M-times slower than a single uniformly scanning channel. From the last equation can be derived:

$$\tau_p = \frac{\tau}{2} = \frac{M \cdot PRI}{S \cdot 2}.$$

If the condition $u \leq 1.9$ is not met for the non-uniformity of the respective mode, $\tau$ and thus $\tau_p$ will be proportionally reduced until u=1.9.

The swath width W that can be achieved with a mode is $$W = (S-1) \cdot \tau \cdot \frac{c}{2}.$$

For determining the necessary peak power or average power with transmission, the conventional instrument (A) (see FIG. 1) is used as reference.

An average power of 750 W, a PRF of 5280 Hz and a duty cycle of 25% are used as typical operating parameters of the reference instrument (A). This leads to pulse durations of approx. 47 μs and a peak power of 3 KW.

In order that the SAR instrument (C) (see FIG. 1) according to the invention has approximately the same SNR as the reference instrument (A) (the SNR of instrument (B) of FIG. 1 with the same duty cycle is higher by a factor 3), the energy that is emitted by instrument (C) per pulse should be the same as the individual pulse energy of instrument (A). The following average values of instrument (C) are necessary for the performance analysis:

$$\text{Average scanning period } \overline{PRI} = \frac{S \cdot \tau}{K}$$

$$\text{Average pulse rate } \overline{PRF} = \frac{1}{\overline{PRI}}$$

$$\text{Average duty cycle } \overline{\delta} = \tau_p \cdot \overline{PRF}.$$

For the same SNR of instrument (C) and (A) the peak power $P_0$ with instrument (C) should be adapted to the pulse duration ratio between instrument (A) and (C):

$$P_0 = 3KW \cdot \frac{47\ \mu s}{\tau_p}.$$

The average transmitting power of instrument (C) results as $\overline{P} = P_0 \times \overline{\delta}$.

The following table makes it possible to compare some modes of non-uniform scanning compared to conventional reference system (A). The following can be established:

1. Large components of the mode vector lead to short pulses.
2. Short pulses lead to large swath widths and high peak power values.
3. The average transmitting power is higher with non-uniform scanning than with the conventional instrument (A), because a portion of the pulses is lost for the azimuth processing.
4. The example 3 is regarded as a good compromise between swath width and peak power.

The consistently high peak power values can be reduced to acceptable values through the frequency multiplex method according to the invention during transmission:

|  | Ref. Instr. (A) | Example 1 | Example 2 | Example 3 | Example 4 | Example 5 |
|---|---|---|---|---|---|---|
| PRI mode | Uniform | τ [10, 9, 8, 7, 6] | τ [19, 7, 6, 5, 3] | τ [3, 3, 3, 2, 2, 2] | τ [3, 3, 2, 2, 1, 1] | τ [3, 3, 2, 2] |
| Sequence length K = number of necessary SCORE beams | — | 5 | 5 | 6 | 6 | 4 |
| M | — | 4 | 4 | 3 | 3 | 2 |
| Pulse duration where $PRI_0$ = 5280 Hz and u = 1.9 | 47 μs | 9.5 μs | 11.2 μs | 16.4 μs | 18 μs | 18.9 μs (where u = 1.6) |
| Swath width (slant range) | 28.4 km | 110.8 km | 97.8 km | 68.7 km | 59.4 km | 51.1 km |
| Average pulse rate | 5.3 kHz | 6.6 kHz | 7.4 kHz | 12.2 kHz | 13.9 kHz | 10.6 kHz |
| Average duty cycle | 25% | 6.3% | 8.3% | 20% | 25% | 20% |
| Average transmitting power | 750 W | 938 W | 1.05 kW | 1.74 KW | 1.97 KW | 1.5 KW |
| Peak power | 3 KW | 15.0 KW | 12.6 KW | 8.7 KW | 7.9 KW | 7.5 KW |
| Peak power with three TX antennas or apertures | — | 5.0 KW | 4.2 KW | 2.9 KW | 2.6 KW | 2.5 KW |

Since a higher average PRF is used in contrast to instrument (B), relatively short pulse durations $\tau_p$ result with the SAR device according to the invention. In order to achieve the same SNR as with reference instrument (A), however, with instrument (C) each pulse should bear approximately the same energy as with instrument (A). This leads to the relatively high peak power values of the table above.

In principle, these high powers can be realized by parallelization of power amplifiers, which, however, entails high risks in particular with applications in space: with tube amplifiers with several kW pulse power there is, for example, the risk of high-energy effects, such as multipaction, with semiconductor amplifiers on the one hand there are technological limitations, on the other hand the increase in the amplifier density, i.e., the number of amplifiers per area, can lead to serious thermal problems.

This problem can be remedied by the use of several (in this case: three) transmission modules and front ends, which emit different frequency ranges of the transmitting chirps coherently and simultaneously:

TX1 transmits the first third of the chirp: −B/2<f<−B/6
TX2 transmits the second third of the chirp: −B/6<f<B/6
TX3 transmits the third third of the chirp: B/6<f<B/2

The threefold transmission energy can be irradiated within the given pulse duration $\tau_p$ through the simultaneity of the transmission. The peak power requirement for an individual transmission module therefore falls to a third of the nominal total value (see table above). The data streams can be separated by digital frequency filters during processing.

The principle of distributing the signal bandwidth over several modules transmitting simultaneously is particularly interesting when different lobe widths are required for different radar alignments: in far range the entire transmission aperture is used for a chirp of full bandwidth. In near range a much broader lobe is required, which is expediently produced with a small aperture (only phased beam expansion is not effective); however, not using antenna parts means not only lower antenna gain, but also additionally reduced pulse power. This is avoided by the method described.

As already explained above, with the invention several independent antenna lobes are used to separately receive and store the echoes that come back from the individual pulses or pulse signals. So-called range ambiguities, that is, as it were, a crosstalk from one lobe to an adjacent lobe, occur when the receiving lobes are not separated well enough. In a case of this kind, a lobe receives not only the echoes of its pulse but also—with reduced amplitude—the echoes of the pulses of the neighboring lobes.

Therefore attention should be paid to the formation of an antenna lobe in elevation with sufficiently low side lobes. With instrument (B) or (C) from FIG. 1 this occurs with digital beam forming (DBF) in the digital domain. This is particularly important with instrument (C) due to the smaller PRI and the echo centers therefore lying closer to one another on the object to be scanned. With DBF, the individual signals of the sub-apertures, i.e., the signals of the RX antennas RX1 through RX17 are provided with suitable, in particular time-dependent complex weighting factors. Since the precise location of the neighboring pulses is known, zeros can be inserted in a very targeted manner at the corresponding locations of the antenna patterns generated by the sub-apertures.

An even more effective method of suppressing range ambiguities lies in STAP (Space-Time Adaptive Processing). STAP is described extensively in the book "Space-Time Adaptive Processing" by R. Klemm, IEE Radar, Sonar, Navigation and Avionics Series 9, 1998, ISBN 0 85296 946 5. With STAP, which is used for cluster suppression in the detection of moving targets from SAR raw data, zeros are placed not only as with the antenna pattern adaptation in the spatial (angular) area (as explained above), but in the combined space-time range of the signals. The higher dimensionality of this signal range and the use of an optimum processor with STAP always lead to filter results that are at least as good, but sometimes better than with mere pattern adaptation. The physical principle behind the suppression ("filtering") of undesirable signals lies in the combined characterization of the signal in the time and space range; the latter means in the establishment of the angular direction from which the signal enters the front end. For this purpose a multi-aperture front-end, as with HRWS SAR, is an essential prerequisite. The separation accuracy achievable with this method increases with the overall height of the RX antenna and the number of its sub-apertures.

The possibility of data reduction according to the invention is explained below. Without data reduction, the raw signals of all 17 elevation parameters RX1-RX17 must be temporarily stored and later transmitted to a central SAR processor for evaluation. Whereas with instrument (B) a maximum of 5280 range lines per second occur, with the instrument (C) according to the invention this is as may as correspond to the average pulse frequency. An efficient data reduction is possible in particular when the DBF is carried out onboard, i.e., in the instrument with the antenna, for example, an SAR satellite. In this manner 17 aperture-specific range lines per pulse are converted into K beam-specific range lines (e.g., K=5).

As a second step of an on-board data reduction, those parts can be eliminated from the beam-specific range lines, where more than M samples are present in an azimuth column per K pulses. Disregarding the pulse length range line ranges, in FIG. 6 these are, for example, behind the range shown first here, since respectively 5 samples are available in the azimuth there compared to only 4 samples in the first column in the storage. The fifth sample is not necessary for the azimuth processing and therefore does not need to be transmitted to a central SAR processor. This second step is of particular importance with high average PRF.

According to the invention, with non-uniform PRI large swaths can be recorded with simultaneously high resolution as with an HRWS SAR. However, the antenna according to the invention is thereby considerably smaller, for example, at least three times smaller than the antenna of the known HRWS SAR. Furthermore, due to the smaller antenna there are fewer back ends than with the HRWS SAR. The requirements regarding the transmitting power are higher, however. Furthermore, with the invention an SNR performance can be achieved as with a conventional monostatic SAR. The occurrence of black stripes in the subsequent SAR image can be avoided through the non-uniform PRI. By varying the non-uniform PRI, an SAR based on the invention can be optimally adapted to a specific mission.

The enlarged total aperture in elevation with the invention and the plurality of sub-apertures of the receiving antennas provide the following advantages:
1. The receiving antenna gain is increased with a large swath width.
2. The receiving antenna lobe and its frequency spreading can be dynamically tracked.
3. Range ambiguities can be suppressed.
4. Several receiving lobes can be generated with a high PRF.

Finally, it should be noted that the number and size of the sub-apertures of the receiving antenna according to the invention can be adapted depending on the intended use.

Overall, with the invention the essential functions of an HRWS SAR are achieved without a PRF reduction and with a much smaller antenna.

As a further embodiment the invention discloses a high-resolution synthetic aperture radar device, which comprises at least two transmitting antennas for generating radar beams for scanning an object, wherein the at least two transmitting antennas are operated simultaneously in the frequency multiplex.

With synthetic aperture radar an increase in the transmitting power of the transmitting antenna is often necessary or desirable. At the same time, however, the aperture (height and width) of the transmitting antenna is fixed for systematic reasons.

With passive antennas, the transmitting power of which increases proportionately to the pulse power of the fed HF signal, increased power can be realized in principle by the parallelization of power amplifiers. However, this entails great risks, in particular with applications in space: with tube amplifiers with several kW pulse power, there is, for example, the risk of high-energy effects such as multipaction. With semiconductor amplifiers on the one hand there are technological limitations and on the other hand the increase in amplifier density, i.e., the number of amplifiers per area, can lead to serious thermal problems.

The use of adequately enlarged active antennas, the transmitting power of which increases proportionately to the antenna area, without requiring high-power amplifiers, does not lead to the solution, because a specific antenna aperture—and consequently antenna area—may not be regularly exceeded for system aspects.

The present invention solves the problem by the parallel operation of several geometrically identical transmitting antennas of the desire aperture in the frequency multiplex. For example, a chirp of bandwidth B and pulse duration $\tau_p$ is to be sent. Each of the transmitting antennas (in this case: three transmitting antennas TX1, TX2, TX3) transmit coherently and simultaneously different frequency ranges of the transmitting chirp:

TX1 transmits the first third of the chirp: $-B/2 < f < -B/6$
TX2 transmits the second third of the chirp: $-B/6 < f < B/6$
TX3 transmits the third of the chirp: $B/6 < f < B/2$ In the example, through the simultaneity of the transmission the threefold transmission energy can be irradiated within the given pulse duration $\tau_p$ without necessitating an increase in the power of the individual antenna. The individual antenna that is too weak needs therefore only be reproduced in the same manner and fed with a different signal. Even its bandwidth requirement is thereby reduced.

However, the described invention can be used not only to increase the system transmitting power with unchanged aperture. The method makes it possible in general to decouple transmitting power and aperture size with active antennas. Conversely, an aperture of sufficient transmitting power can also be divided into several sub-apertures and associated transmission modules in order to realize the total transmitting power with the reduced aperture. The principle of distributing the signal bandwidth among several simultaneously transmitting modules is particularly interesting when different lobe widths are needed for different radar alignments of one and the same instrument: in far range the entire transmission aperture is used for a chirp of full bandwidth. In near range, a much broader lobe is required, which is expediently produced with a small aperture. A phased beam expansion would not be sufficiently effective; and switching off antenna partial areas would mean reduced pulse power. This is avoided by the method described.

With the present invention, the signals must be separated again by analog or digital frequency filters in the processing of the radar echoes received.

The concrete numbers specified in the specification for operating parameters are cited only by way of example; the disclosure of the invention is not limited thereto.

LIST OF REFERENCE NUMBERS

10 High-resolution synthetic aperture radar device
12 Earth's surface
14 Receiving antenna of the SAR device 10
16 Radar beam
18 Pulse signals of the radar beam 16
20, 22, 24 Simultaneously emitted radar beams
26 Gate

The invention claimed is:
1. A high-resolution synthetic aperture radar device comprising:
a plurality of transmitting antennas for producing plural radar beams for scanning an object;

a receiving antenna for receiving the plural radar beams reflected by the object, the receiving antenna comprising several sub-apertures arranged in elevation, wherein each of the plural radar beams includes a pulse signal emitting a pulse at a predefined rate, and the predefined rates of the pulse signals have irregular time intervals.

2. The high-resolution synthetic aperture radar device according to claim 1, wherein the sub-apertures are arranged to form a single azimuth panel.

3. The high-resolution synthetic aperture radar device according to claim 1, further comprising a processor structured and arranged to process received radar echoes in azimuth with a resampling method.

4. The high-resolution synthetic aperture radar device according to claim 3, further comprising one respective receiving channel for each of the radar echoes.

5. The high-resolution synthetic aperture radar device according to claim 4, wherein the radar echoes in each respective receiving channel is processed by digital beam forming.

6. The high-resolution synthetic aperture radar device according to claim 5, wherein the respective receiving channels are structured and arranged to strictly separate a received radar echo from adjacent received radar echoes.

7. The high-resolution synthetic aperture radar device according to claim 6, further comprising a weighting factor unit structured and arranged to provide signals of the sub-apertures in a digital domain with time-dependent complex weighting factors.

8. The high-resolution synthetic aperture radar device according to claim 7, wherein the time-dependent complex weighting factors are formed so that an antenna diagram in the directions of other antenna diagrams obtains a zero.

9. The high-resolution synthetic aperture radar device according to claim 5, further comprising a space-time adaptive processor for the signals of the sub-apertures.

10. The high-resolution synthetic aperture radar device according to claim 3, further comprising a processor structured and arranged to compress data obtained from the received radar echoes before transmission to a ground station.

11. The high-resolution synthetic aperture radar device according to claim 1, wherein the plurality of transmitting antennas comprises at least two transmitting antennas operated simultaneously in a frequency multiplex.

12. The high-resolution synthetic aperture radar device according to claim 1, further comprising respectively one transmission module and front end for generating an antenna pattern and emitting a pulse for each of the plurality of transmitting antennas.

13. The high-resolution synthetic aperture radar device according to claim 12, wherein the transmission modules and front ends are structured and arranged to emit transmitting chirps coherently and simultaneously.

14. The high-resolution synthetic aperture radar device according to claim 13, wherein each transmission module and front end is structured and arranged to respectively emit in a different frequency range.

15. The high-resolution synthetic aperture radar device according to claim 13, further comprising digital frequency filters to separate in terms of frequency the data streams produced from radar beams received.

16. The high-resolution synthetic aperture radar device comprising:
at least two transmitting antennas for producing radar beams with pulse signals for scanning an object,
wherein the at least two transmitting antennas are simultaneously operable in a frequency multiplex.

17. An antenna for the high-resolution synthetic aperture radar device according to claim 16, wherein
the at least two transmitting antennas are structured and arranged to emit respectively one radar beam in a microwave range; and
a receiving antenna structured and arranged to receive reflected radar beams in the microwave range, and the receiving antenna in elevation comprising several sub-apertures that form fewer than three azimuth apertures.

18. The antenna according to claim 17, wherein the at least two transmitting antennas are arranged next to one another in elevation.

19. The antenna according to claim 17, wherein the receiving antenna is arranged next to the at least two transmitting antennas in elevation.

20. The antenna according to claim 17, wherein the sub-apertures form exactly one azimuth aperture.

21. The antenna according to claim 17, wherein a height of each sub-aperture in elevation is lower than the height of each transmitting antenna in elevation.

22. A method for a high-resolution synthetic aperture radar device, comprising:
producing plural radar beams for scanning an object from a plurality of transmitting antennas;
receiving the plural radar beams reflected by the object with a receiving antenna comprising several sub-apertures arranged in elevation; and
emitting pulses at predefined rates as pulse signals in the produced radar beams, wherein the predefined rates of the pulse signals have irregular time intervals.

23. A high-resolution synthetic aperture radar device comprising:
at least one transmitting antenna for producing plural radar beams; and
a receiving antenna for receiving radar beams reflected by the object, the receiving antenna comprising several sub-apertures arranged in elevation,
wherein the plural radar beams include plural pulse signals, in which pulses of at least one of the plural pulse signals are emitted at a time interval different from pulses of at least one other of the plurality of pulse signals.

* * * * *